United States Patent
Selwyn

(10) Patent No.: US 9,556,995 B2
(45) Date of Patent: Jan. 31, 2017

(54) GAS SPRING ACCUMULATOR

(71) Applicant: WATER POWERED TECHNOLOGIES LIMITED, Bude, Cornwall (GB)

(72) Inventor: Frederick Philip Selwyn, Bude (GB)

(*) Notice: Subject to any disclaimer, the term of this patent is extended or adjusted under 35 U.S.C. 154(b) by 98 days.

(21) Appl. No.: 14/434,409

(22) PCT Filed: Oct. 14, 2013

(86) PCT No.: PCT/GB2013/052679
§ 371 (c)(1),
(2) Date: Apr. 9, 2015

(87) PCT Pub. No.: WO2014/060734
PCT Pub. Date: Apr. 24, 2014

(65) Prior Publication Data
US 2015/0267854 A1    Sep. 24, 2015

(30) Foreign Application Priority Data
Oct. 16, 2012 (EP) ..................................... 12007170

(51) Int. Cl.
F16L 55/04      (2006.01)
F16L 55/053     (2006.01)
F15B 1/08       (2006.01)
F04B 11/00      (2006.01)
F04B 43/02      (2006.01)

(52) U.S. Cl.
CPC .......... *F16L 55/053* (2013.01); *F04B 11/0008* (2013.01); *F04B 11/0033* (2013.01); *F04B 43/02* (2013.01); *F15B 1/08* (2013.01); *F15B 2201/205* (2013.01); *F15B 2201/21* (2013.01); *F15B 2201/3151* (2013.01); *F15B 2201/4155* (2013.01); *F15B 2201/515* (2013.01)

(58) Field of Classification Search
CPC .. F16L 55/053; F04B 11/0033; F04B 11/0008; F04B 43/04; F15B 1/08; F15B 2201/515; F15B 2201/205; F15B 2201/3121; F15B 2201/4155
USPC ........................ 138/26, 30, 31; 417/540, 542
See application file for complete search history.

(56) References Cited

U.S. PATENT DOCUMENTS

| | | | | |
|---|---|---|---|---|
| 4,449,552 A | * | 5/1984 | Porel | F15B 1/106 138/30 |
| 6,478,051 B1 | * | 11/2002 | Drumm | F15B 1/033 138/30 |
| 6,564,971 B2 | * | 5/2003 | Heyes | B01F 5/0471 222/129.1 |

(Continued)

*Primary Examiner* — Patrick F Brinson
(74) *Attorney, Agent, or Firm* — Galbreath Law Offices, P.C.; John A. Galbreath

(57) ABSTRACT

A gas spring accumulator comprising:—a housing (2, 3) provided with an inlet (20); and—a flexible diaphragm (4) dividing the interior of the housing into a working chamber (7) which is exposed to system pressure via the inlet, and a gas chamber (6); characterised in that the housing includes a diaphragm element (4) having one side exposed to system pressure via the inlet (20) and an opposite side exposed to a further chamber (13), a first non-return valve (17) arranged to admit atmospheric gas into the further chamber (13), and a second non-return valve (29) arranged to admit gas from the further chamber (13) into the gas chamber (6).

13 Claims, 2 Drawing Sheets

(56) References Cited

U.S. PATENT DOCUMENTS

| | | | |
|---|---|---|---|
| 6,644,354 B2 * | 11/2003 | Dinkel | F15B 1/103 138/30 |
| 2008/0292483 A1 * | 11/2008 | De Koning | F15B 1/021 417/540 |
| 2013/0209280 A1 * | 8/2013 | Fritsch | F04B 43/0081 417/53 |

* cited by examiner

GAS SPRING ACCUMULATOR

TECHNICAL FIELD OF THE INVENTION

This invention relates to accumulators of the kind which incorporate gas springs.

BACKGROUND

Accumulators may be used to store a volume of fluid under pressure or absorb pressure shocks caused by a sudden pulse of fluid entering an hydraulic system. Examples are disclosed in GB 892 019 and GB 2 083 556-A. Such accumulators may contain a sealed moveable member such as a flexible diaphragm or piston with a compressible gas or mechanical spring on one side acting in opposition to the system fluid pressure on the other. Whilst the characteristics of a mechanical spring must be pre-selected at the outset to be compatible with the range of pressures likely to be encountered in the system, a gas spring has the advantage that its characteristics can be changed at any time by charging or releasing the gas pressure, as required.

EP 1 079 170 A2 discloses a gas spring accumulator comprising:
 a housing provided with an inlet; and
 a flexible diaphragm dividing the interior of the housing into a working chamber which is exposed to system pressure via the inlet, and a gas chamber;
 wherein the housing is provided with a port which communicates with the gas chamber and to which an external pressure vessel is releasably attached.

One disadvantage of gas spring accumulators is that a large gas chamber may be required to store the charge. Such devices are often difficult to accommodate, and may also be subject to vigorous pressure testing requirements. Furthermore, there is usually no easy way of determining when the accumulator is charged to a pressure which is compatible with the system pressure, which may necessitate taking readings of the system pressure and the gas charge.

The present invention seeks to provide a new and inventive form of accumulator which is capable of operating at its maximum efficiency without having to manually charge the system to the required gas pressure.

A second aim is to provide an accumulator which is relatively compact and lightweight yet is capable of accommodating a large pressure charge when required.

A third aim is to provide an indication of the charge pressure without using additional pressure gauges.

SUMMARY OF THE INVENTION

The present invention proposes a gas spring accumulator comprising:
 a housing provided with an inlet; and
 a flexible diaphragm dividing the interior of the housing into a working chamber which is exposed to system pressure via the inlet, and a gas chamber;
 characterised in that the housing includes a diaphragm element having one side exposed to system pressure via the inlet and an opposite side exposed to a further chamber, a first non-return valve arranged to admit atmospheric gas into the further chamber, and a second non-return valve arranged to admit gas from the further chamber into the gas chamber.

The accumulator preferably includes an escape valve which allows gas to leave the gas chamber when the pressure increases therein.

The invention also provides a gas spring accumulator comprising:
 a housing provided with an inlet; and
 a flexible diaphragm dividing the interior of the housing into a working chamber which is exposed to system pressure via the inlet, and a gas chamber;
 in which the housing is provided with a port which communicates with the gas chamber and to which an external pressure vessel is releasably attached, and the external pressure vessel is provided by a length of conduit.

The invention also provides a gas spring accumulator comprising:
 a housing provided with an inlet;
 a flexible diaphragm dividing the interior of the housing into a working chamber which is exposed to system pressure via the inlet, and a gas chamber, the diaphragm carrying a diaphragm support assembly; and
 an indicator member, movable by the diaphragm support assembly, projects through the wall of the housing.

The indicator member preferably projects into a sight element which is mounted on the outside of the chamber.

BRIEF DESCRIPTION OF THE DRAWINGS

The following description and the accompanying drawings referred to therein are included by way of non-limiting example in order to illustrate how the invention may be put into practice.

In the drawings.

DETAILED DESCRIPTION OF THE DRAWINGS

Figure 1:
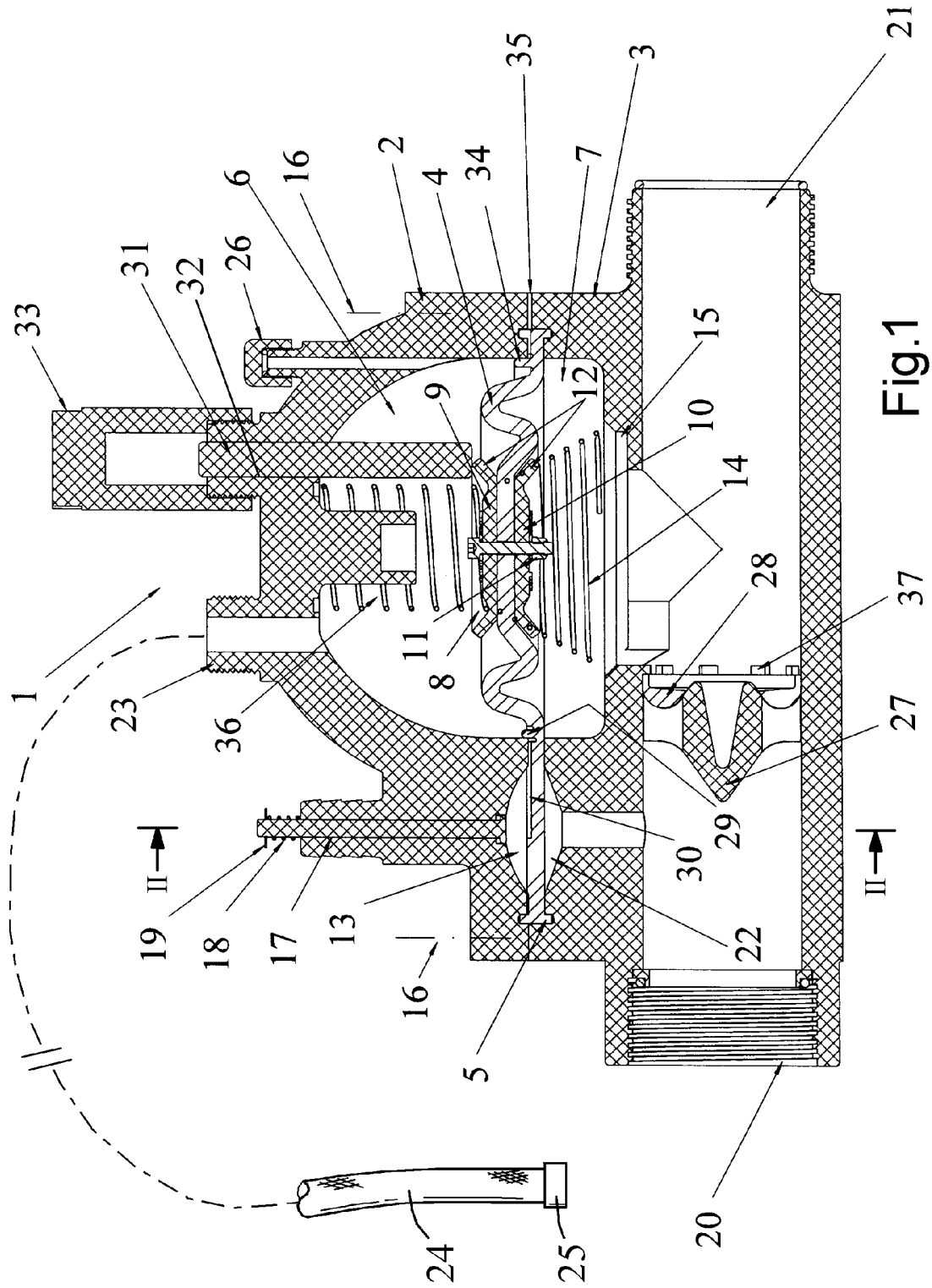
FIG. 1 is a sectional view of an improved pneumatic accumulator in accordance with the invention.

Referring firstly to FIG. 1, the accumulator comprises a housing 1 formed with upper and lower parts 2 and 3, which may be cast of metal or moulded of plastic for example. A flexible diaphragm 4 is interposed between the housing parts 2 and 3, with a peripheral bead 5 sealably interposed between the two parts. The diaphragm thus divides the interior of the housing into an upper gas chamber 6 and a lower working chamber 7. A central region of the diaphragm 4 is held by a support assembly 8, including upper and lower disc-shaped support elements 9 and 10, and the diaphragm is sealably sandwiched between the two elements, which are clamped together by a nut-and-bolt fixing 11 passing through the diaphragm. The disc-shaped elements 9 and 10 are both provided with shallow peripheral flanges 12. The support assembly 8 is supported in a rest position against gas pressure within the chamber 6 by a compression spring 14, located within the working chamber 7. The spring is radially located within a recess 15 at the bottom of chamber 7, and by the peripheral flange 12 of the lower support element 10.

The two housing parts 2 and 3 can be held together by bolts 16. The lower housing part 3 is provided with axially aligned fluid inlet and outlet ports 20 and 21, one or both of which can be used to connect the working chamber 7 to the system fluid pressure. The accumulator may typically be connected in a liquid flow line, for example. The upper part 2 is provided with a gas port 23 for connection to an expansion vessel in the form of a conduit such as a length of pressure hose 24. The hose is sealed at the far end by a suitable end fitting 25 to provide a sealed pneumatic chamber which may be charged with gas via a suitable charge valve 26 on the upper housing part 2. The pressure hose can easily be accommodated in any convenient space. Furthermore, by selecting a standard pressure hose and fittings with an appropriate pressure rating the need for pressure testing of the expansion vessel is avoided. The capacity of the expansion vessel can easily be adjusted to the size required for any particular application simply by changing the length and/or diameter of the hose.

The accumulator also incorporates a charge indicator comprising an indicator element provided by a rod 31 which is slidably inserted through a port 32 on the upper housing part 2. The lower end of the rod 31 is in contact with the upper support element 9. The rod 31 projects into a transparent sight capsule 33 which is sealably engaged with the port 32. When the working chamber 7 is subjected to system pressure exceeding the pressure exerted by the charge within the gas chamber 6 and pressure hose 24, the diaphragm 4 will tend to move upwards, causing the indicator rod to rise within the sight capsule 33. Thus, movement of the indicator rod 31 will indicate that compression of the gas charge is occurring and the system fluid is expanding into the chamber 7. As the system pressure falls the diaphragm returns under the influence of the compressed gas charge, expelling a proportionate quantity of system fluid from the chamber 7.

The accumulator can also be used with negative pressures so that if a partial vacuum is introduced into the gas chamber 6 and a negative pressure is applied to the fluid in the working chamber 7 the diaphragm will move downwards against the action of spring 14 but will return as the pressure of the working fluid increases.

The accumulator is suitable for use in a variety of applications, including pressure accumulation, shock suppression and fluid pumping. The accumulator can, for example, be used to prevent water hammer in water pumping systems due to fluctuating flows and pressures. The accumulator could also be as a means of pumping fluid, whereby system fluid can be induced and expelled by the application of variable pressure on the opposite side of the accumulator diaphragm using appropriate non-return valves on the inlet and/or outlet ports to create a unidirectional flow through the working chamber.

Figure 2:
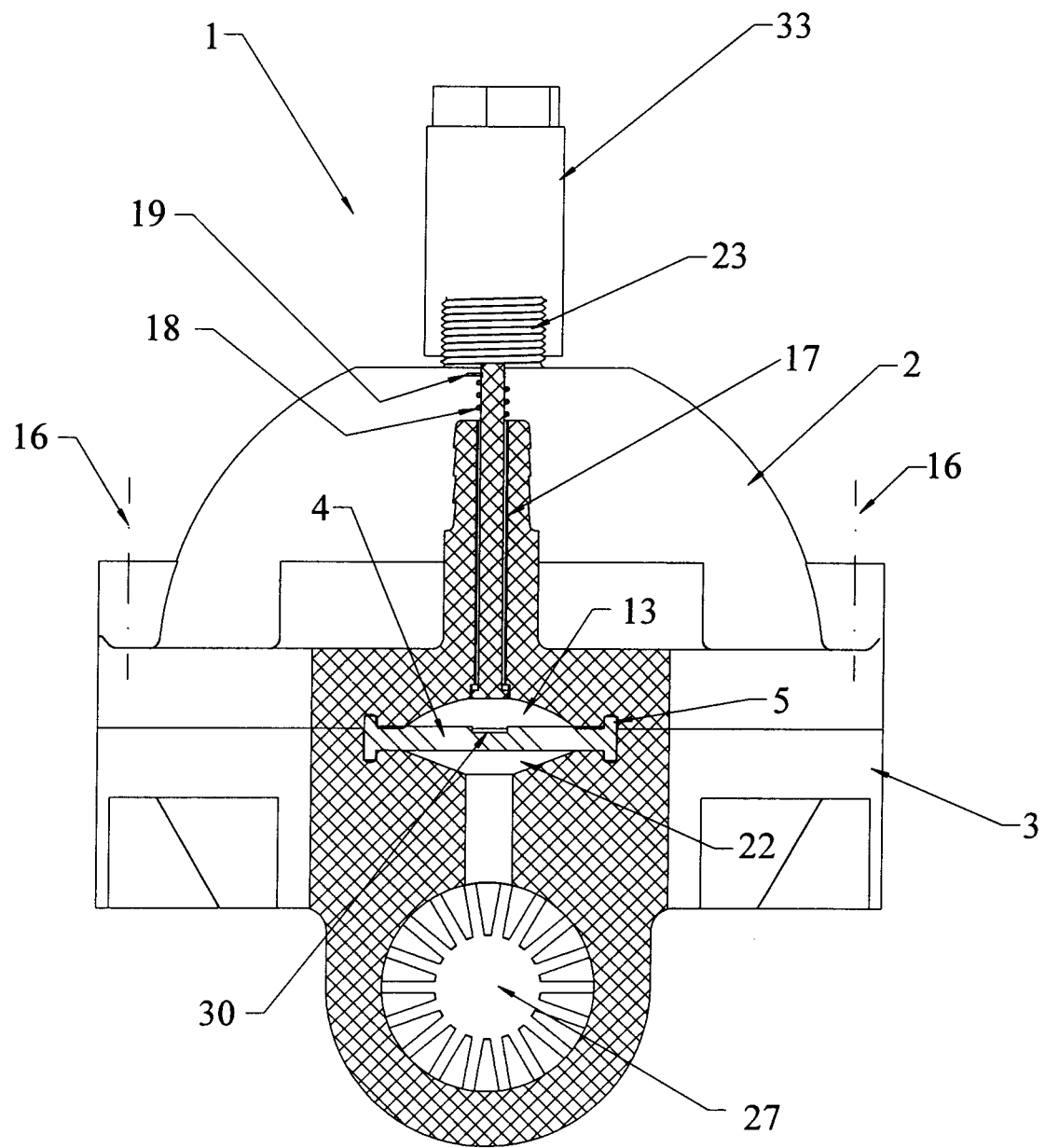
FIG. 2 is a further view of the improved pneumatic accumulator on the section II-II of FIG. 1.

The improved accumulator shown in FIGS. 1 and 2 incorporates the following additional features which obviate the need for re-charging the accumulator with gas, e.g. when the volume of the external expansion vessel is changed. The additional features include a non-return valve disposed between the inlet and outlet ports 20 and 21, comprising a body and seat assembly 27 and flexible annular valve member 28 which is retained by lugs 37. A port leading to a cavity 22 is formed in the lower housing part 3 to communicate with the inlet port 20. An aligned chamber 13 and communicating bore are provided in the upper housing 2 to accommodate a sliding poppet valve 17 which is retained by an external compression spring 18 and circlip 19, biassing the valve into a closed position. An extended edge portion of the diaphragm 4 sealingly separates the cavity 22 from chamber 13. A recess 30 formed in the top face of diaphragm 4 provides a port between the chamber 13 and the upper gas chamber 6. A flexible non-return valve member 29, also formed as part of diaphragm 4, is located in contact with the inner wall of chamber 6. A sudden flow of fluid entering the inlet port 20 and cavity 22 will force the extended portion of the diaphragm 4 upwards thereby compressing the gas in the upper chamber 13. If this gas pressure is greater than the gas pressure within chamber 6, then gas will flow past the valve member 29 into chamber 6 thereby partially increasing the pressure in this chamber. As the pressure pulse of fluid decreases or ceases within the inlet 20, the extended portion of diaphragm 4 bounding the chamber 13 will return to its rest position, thereby causing the pressure in chamber 13 to decrease. The drop in pressure allows the air inlet poppet valve 17 to be opened by external atmospheric pressure allowing gas to enter chamber 13. At the same time, the non-return valve 29 will close to prevent escape of air from the gas chamber 6.

In this embodiment an additional compression spring 36 is positioned within the gas chamber 6 to apply partial pressure to the top of diaphragm 4 in opposition to the partial pressure applied to the bottom of diaphragm 4 by the compression spring 14 positioned in the lower fluid chamber 7. The pressure of the two springs will hold the diaphragm 4 in an unstressed position between the lower and upper chambers when there are no gas or fluid forces applied. In operation, if the gas pressure in chamber 6 becomes greater than the fluid pressure in chamber 7, the diaphragm 4 will be urged downwards. A flexible valve flap 34 formed as part of the diaphragm 4 is in normal contact with the inner wall of the gas chamber 6. A port 35 is formed by a recess in the top surface of the diaphragm 4 and a sealing face of the upper housing 2 communicating externally to atmosphere. This port 35 is normally closed by the valve flap 34, but as the diaphragm 4 is displaced downward by increasing gas pressure in chamber 6, the valve flap is caused to retract from its seating on the inner wall of the gas chamber 6, thereby forming an escape valve which allows gas from within this chamber to escape via the port 35 to atmosphere and reducing the pressure exerted within chamber 6 on the top of the diaphragm 4. This reduction of pressure allows the diaphragm to rise and the valve flap 34 to reseal against the chamber wall, thereby sealing the port 35 and preventing further gas from escaping from the chamber.

This automatic regulation of the gas flow into and out of the gas chamber 6 enables the accumulator to operate at its maximum efficiency without the requirement for external gas charging of the system.

Although a pneumatic accumulator is described, using air as the gas charge, it will be appreciated that other compressible gases could be used, e.g. nitrogen.

Whilst the above description places emphasis on the areas which are believed to be new and addresses specific problems which have been identified, it is intended that the features disclosed herein may be used in any combination which is capable of providing a new and useful advance in the art.

The invention claimed is:

1. A gas spring accumulator comprising:
   a housing (2, 3) provided with an inlet (20); and
   a flexible diaphragm (4) dividing the interior of the housing into a working chamber (7) which is exposed to system pressure via the inlet, and a gas chamber (6);
   wherein the diaphragm element (4) having one side exposed to system pressure via the inlet (20) and an opposite side exposed to a further chamber (13), a first non-return valve (17) arranged to admit atmospheric gas into the further chamber (13), and a second non-return valve (29) arranged to admit gas from the further chamber (13) into the gas chamber (6).

2. A gas spring accumulator according to claim 1 which includes an escape valve (34) which allows gas to leave the gas chamber (6) when the pressure increases therein.

3. A gas spring accumulator according to claim 1 in which one or both of the second non-return valve (29) and the escape valve (34) includes a valve element which is integrally formed with the diaphragm (4).

4. A gas spring accumulator according to claim 1 in which the working chamber (7) is provided with a fluid outlet (21) such that the fluid inlet and outlet (20, 21) can be used to connect the working chamber into a flow line, and a non return valve (28) is disposed between the inlet and outlet ports (20, 21).

5. A gas spring accumulator according to claim 1 in which the housing is provided with a port (23) which communicates with the gas chamber (6) and to which an external pressure vessel (24) is releasably attached, and the external pressure vessel is provided by a length of conduit (24).

6. A gas spring accumulator according to claim 5 in which the length of conduit (24) is flexible.

7. A gas spring accumulator according to claim 1 in which the diaphragm (4) carries a diaphragm support assembly (8).

8. A gas spring accumulator according to claim 7 in which the diaphragm support assembly comprises a pair of support elements (9, 10) located on opposite sides of the diaphragm.

9. A gas spring accumulator according to claim 7 in which the diaphragm (4) is sealably sandwiched between the support elements (9, 10) which are held together by a fixing element (11) passing through the diaphragm.

10. A gas spring accumulator according to claim 7 in which the working chamber (7) contains a first spring (14) which acts against the diaphragm support assembly (8).

11. A gas spring accumulator according to claim 10 in which the gas chamber (6) contains a second spring (36) which acts against the diaphragm support assembly (8) in opposition to the first spring (14).

12. A gas spring accumulator according to claim 7 in which an indicator member (32), movable by the diaphragm support assembly (8), projects through the wall of the housing.

13. A gas spring accumulator according to claim 12 in which the indicator member (32) projects into a sight element (33) which is mounted on the outside of the housing.

* * * * *